US012208772B2

(12) United States Patent
Lade et al.

(10) Patent No.: US 12,208,772 B2
(45) Date of Patent: Jan. 28, 2025

(54) RETRACTABLE STEP ASSEMBLY FOR A LADDER

(71) Applicant: DEERE & COMPANY, Moline, IL (US)

(72) Inventors: Gajanan S. Lade, Pune (IN); Shailesh H. Ingole, Pune (IN)

(73) Assignee: DEERE & COMPANY, Moline, IL (US)

( * ) Notice: Subject to any disclaimer, the term of this patent is extended or adjusted under 35 U.S.C. 154(b) by 300 days.

(21) Appl. No.: 17/808,381

(22) Filed: Jun. 23, 2022

(65) Prior Publication Data

US 2023/0415654 A1    Dec. 28, 2023

(51) Int. Cl.
*B60R 3/02* (2006.01)

(52) U.S. Cl.
CPC ..................... *B60R 3/02* (2013.01)

(58) Field of Classification Search
CPC ...... B60R 3/02; A01D 41/1261; E02F 9/0833
See application file for complete search history.

(56) References Cited

U.S. PATENT DOCUMENTS

| | | | | |
|---|---|---|---|---|
| 2,153,945 | A | * | 4/1939 | Vincent .................... B60R 3/02 105/449 |
| 3,083,785 | A | * | 4/1963 | Hyman ..................... B60R 3/00 182/89 |
| 3,833,240 | A | | 9/1974 | Weiler |
| 3,854,752 | A | * | 12/1974 | Flint ........................ B60R 3/02 280/166 |
| 4,053,172 | A | * | 10/1977 | McClure .................. B60R 3/02 182/89 |
| 9,688,204 | B2 | * | 6/2017 | Tsutsumi .................. B60R 3/02 |
| 10,173,594 | B2 | * | 1/2019 | Tanaka ..................... B60R 3/00 |
| 10,612,210 | B2 | * | 4/2020 | Tsutsumi .................. B60R 3/02 |

(Continued)

FOREIGN PATENT DOCUMENTS

| | | |
|---|---|---|
| CN | 202782932 U | 3/2013 |
| CN | 205098066 U | 3/2016 |

(Continued)

OTHER PUBLICATIONS

Image of Deere X-Series Combine Ladder with Rigid Bottom Step Assembly (1 page) (admitted prior art as of Apr. 15, 2022).

(Continued)

*Primary Examiner* — Bryan A Evans (57) ABSTRACT

A step assembly for use with a ladder comprises a first siderail member, a second siderail member, and a step. The first and second siderail members are mounted for pivotal movement about respective pivot axes between a suspended use position and a retracted position. The step has an unlocked position and a locked position. The step is yieldably biased to the unlocked position. In the unlocked position, the step is unlocked relative to the first and second siderail members enabling the step to swing with the first and second siderail members from the suspended use position to the retracted position. In the locked positioned, the step is locked to the first and second siderail members against relative pivotal movement between the step and the first and second siderail members to keep the first and second siderail members in the suspended use position for use of the step.

17 Claims, 12 Drawing Sheets

(56) References Cited

U.S. PATENT DOCUMENTS 11,667,242 B2 * 6/2023 Lee ........................ B60R 3/02
                                                           280/166
2016/0339843 A1 * 11/2016 Rinaldi .................... B60R 3/02

FOREIGN PATENT DOCUMENTS

| CN | 211567811 U | 9/2020 |
| EP | 0410215 A1 | 1/1991 |
| JP | 2009149245 A | 7/2009 |

OTHER PUBLICATIONS

Image of Deere S-Series Combine Ladder with Flexible Rubber Bottom Step Assembly (1 page) (admitted prior art as of Apr. 15, 2022).

Image of Deere Hillmaster Combine Ladder with Foldable Bottom Step Assembly (1 page) (admitted prior art as of Apr. 15, 2022).

\* cited by examiner

RETRACTABLE STEP ASSEMBLY FOR A LADDER

TECHNICAL FIELD

The present disclosure relates to ladders, and, more particularly, to a step assembly for a ladder.

BACKGROUND

Some combine harvesters have a ladder mounted to the exterior of the harvester to enable a person to access the operator's station, or other elevated areas of the machine, and to disembark the machine. The ladder has steps for ascending and descending the ladder.

SUMMARY

According to an aspect of the present disclosure, there is disclosed a step assembly for use with a ladder. The step assembly comprises a first siderail member, a second siderail member, and a step. The first and second siderail members are mounted for pivotal movement about respective pivot axes between a suspended use position and a retracted position angled from the suspended use position laterally of the ladder. The step is movable relative to the first siderail member and the second siderail member between an unlocked position and a locked position. The step is yieldably biased to the unlocked position. In the unlocked position, the step is unlocked relative to the first and second siderail members enabling the step to swing with the first and second siderail members laterally of the ladder from the suspended use position to the retracted position in response to a retracting force. In the locked positioned, the step is locked to the first and second siderail members against relative pivotal movement between the step and the first and second siderail members to keep the first and second siderail members in the suspended use position for use of the step.

According to another aspect of the present disclosure, there is disclosed a step for use with a ladder. A step comprises a first siderail member, a second siderail member, and a step. The first siderail member and the second siderail member have respectively a first pivot axis and a second pivot axis. The first siderail member and the second siderail member are pivotable respectively about the first pivot axis and the second pivot axis between a suspended use position and a retracted position angled from the suspended use position laterally of the ladder. The step is coupled to the first siderail member and the second siderail member. The step has an unlocked position and a locked position. The step is yieldably biased to the unlocked position in which the step is coupled to the first siderail member and the second siderail member for relative pivotal movement between the step and the first siderail member about a third pivot axis and between the step and the second siderail member about a fourth pivot axis enabling the step to swing with the first siderail member and the second siderail member laterally of the ladder from the suspended use position to the retracted position in response to a retracting force. The step is responsive to a downward force to move relative to the first siderail member and the second siderail member from the unlocked position to the locked position in which the step is locked to the first siderail member and the second siderail member against relative pivotal movement between the step and the first siderail member about the third pivot axis and between the step and the second siderail member about the fourth pivot axis for use of the step.

The above and other features will become apparent from the following description and accompanying drawings.

BRIEF DESCRIPTION OF THE DRAWINGS

The detailed description of the drawings refers to the accompanying figures in which.

DETAILED DESCRIPTION

Figure 1:
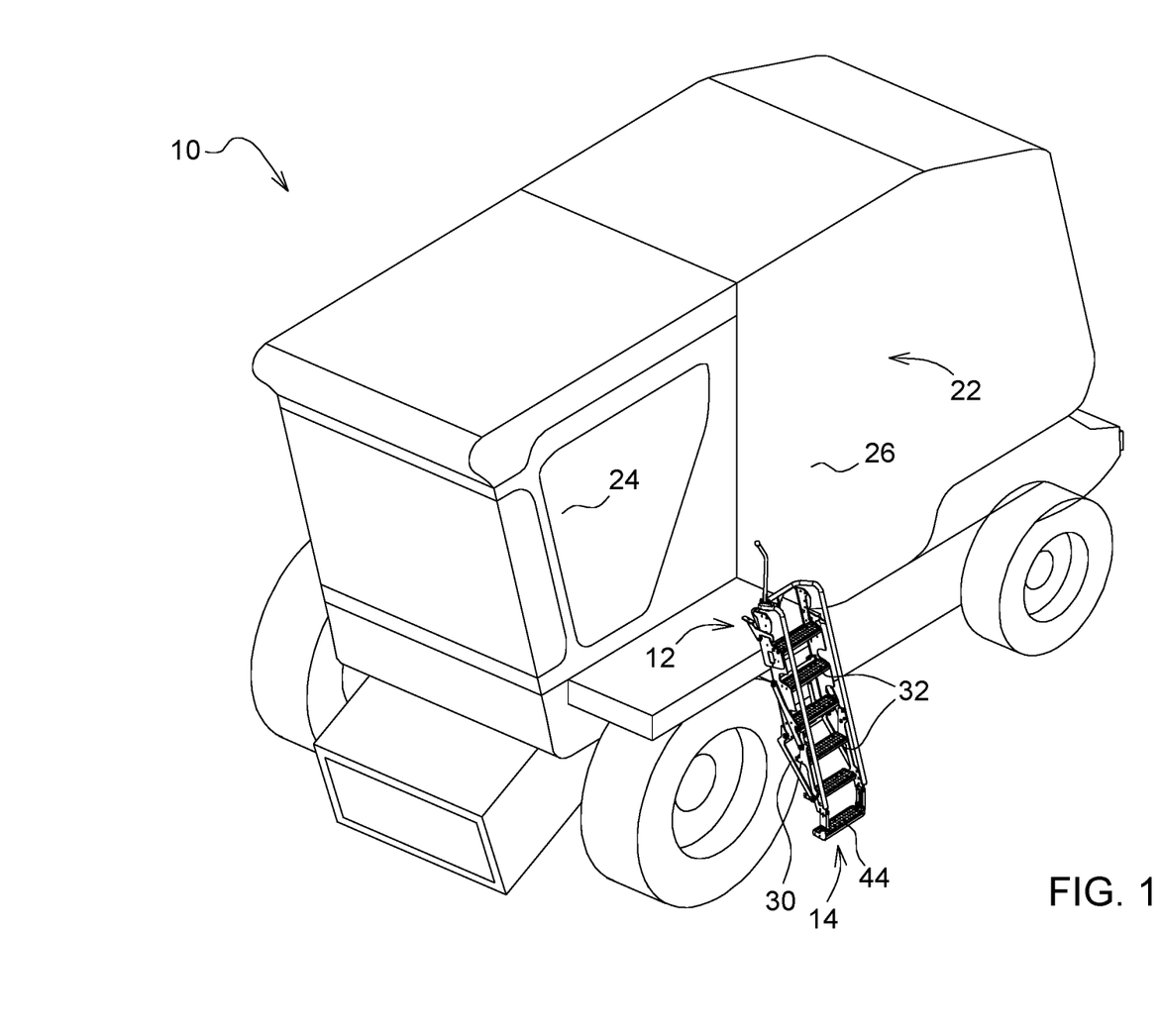
FIG. 1 is a perspective view showing a machine, in the form of, for example, a combine harvester, with a ladder having a bottom retractable step assembly.
Figure 2:
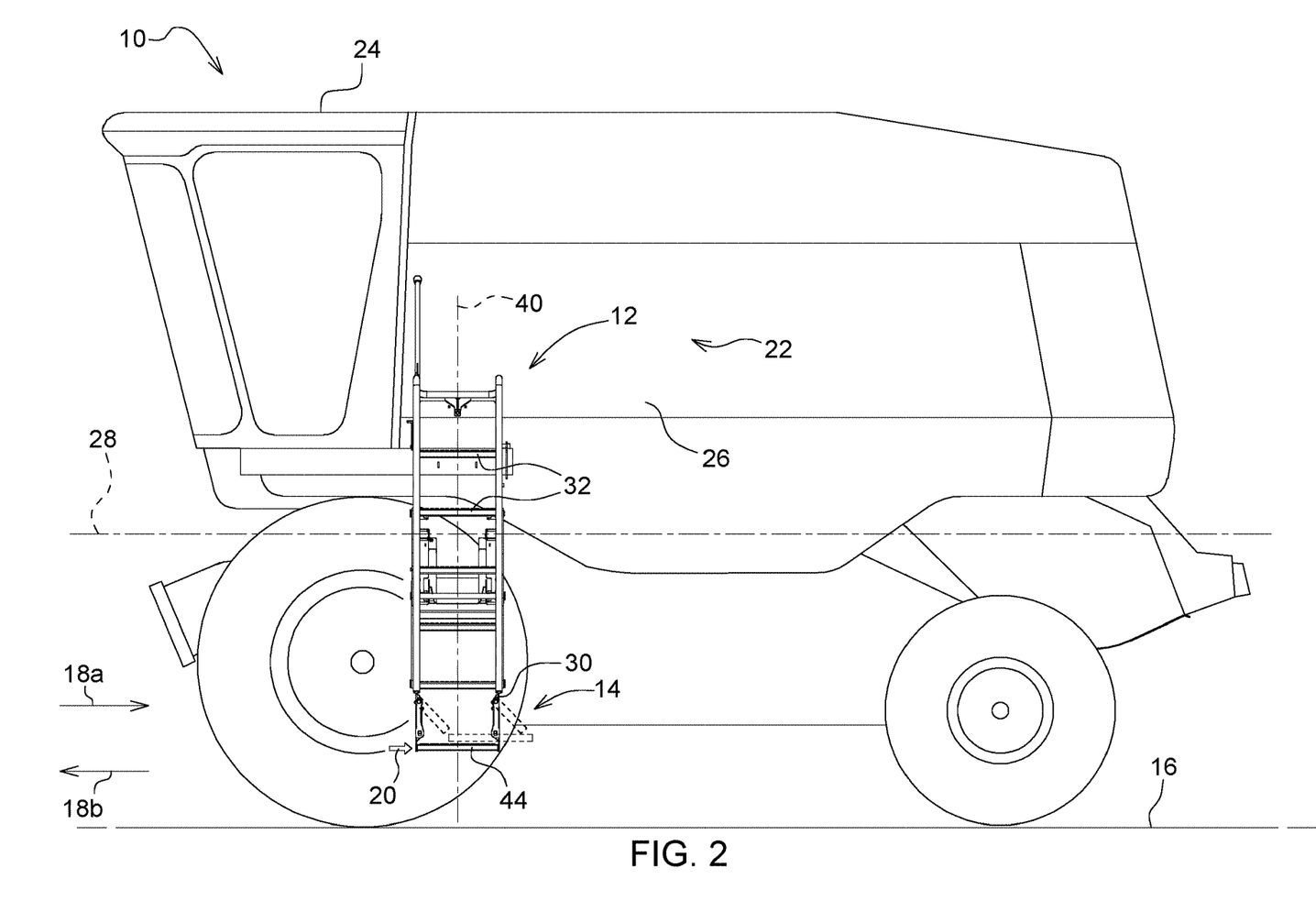
FIG. 2 is an elevation view showing the machine and a force striking the retractable step assembly to move it from a suspended use position (in solid) to a retracted position (in phantom)

Referring to FIGS. 1 and 2, a machine 10 includes a ladder 12 with a retractable step assembly 14 near the bottom of the ladder. The ladder 12 is mounted to a side of the machine 10. The machine 10 is configured to move on a surface 16 such as in a forward direction 18*a* and a rearward direction 18*b*, whether traveling straight or turning. In so doing, the step assembly 14 may accidentally collide with a ground obstacle, thereby imparting a retracting force 20 to the step assembly 14 causing it to retract in a direction opposite to the direction of travel 18*a*, 18*b* so as to yield to the force 20 to try to prevent or otherwise minimize damage to the step assembly 14.

The machine 10 may be configured in a wide variety of ways. For example, the machine 10 may take the form of an agricultural, construction, or other vehicle or machine with a ladder subject to collision with a ground obstacle or other object upon displacement of the vehicle or machine. Illustratively, the machine 10 is configured as a combine harvester that processes crop from a field. In such a case, the machine 10 may have a header that cuts or otherwise picks up crop from a field, gathers the cut crop, and advances the cut crop into the body 22 of the machine 10. The body 10 threshes and separates grain from material other than grain (MOG) with a threshing and separating section, further cleans the grain from MOG with a cleaning section or shoe, gathers the cleaned grain in an onboard grain tank, unloads the cleaned grain from the onboard grain tank to an offboard grain tank with an unloading section, and discharges the residue from the machine 10 with a residue discharge section. A person can control the machine from an operator's station 24. The ladder 12 is mounted to a lateral side 26 of the body 22 of the machine 10 (e.g., left side) relative to a fore-aft axis 28 of the machine 10 so that the person can access the operator's station 24 or disembark the machine 10.

Figure 3:
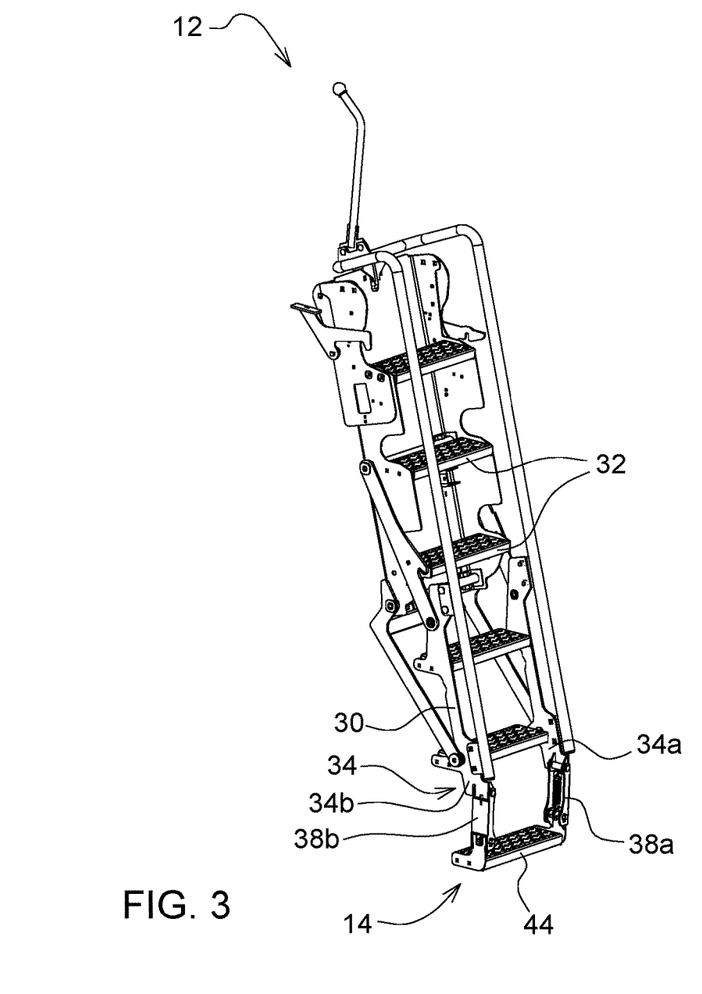
FIG. 3 is a perspective view showing the ladder in a deployed position.
Figure 4:
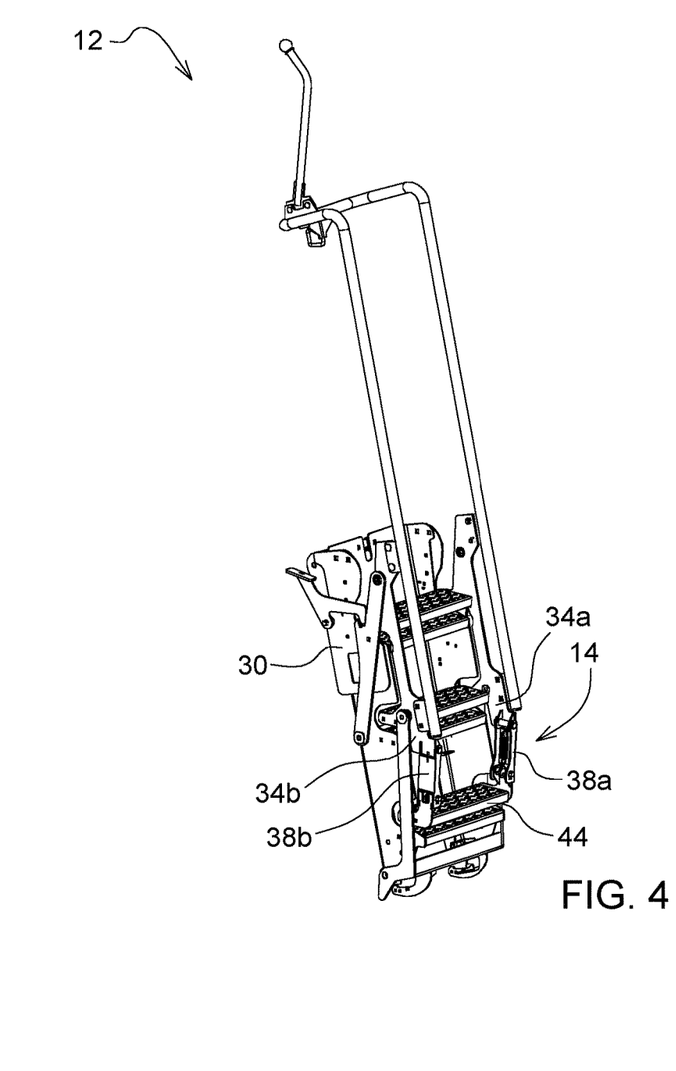
FIG. 4 is a perspective view showing the ladder in a storage position.

Referring to FIGS. 3 and 4, the ladder 12 may be configured in a wide variety of ways. For example, it has a frame 30 and steps 32 coupled to the frame 30. In the illustrated embodiment, the ladder 12 is foldable such that it can be unfolded to a deployed position (FIG. 3) and folded to a storage position (FIG. 4) when not in use. In other embodiments, the ladder 12 may not be foldable, in which case the ladder 12 may be in its use position at all times. In either case, the frame 30 of the ladder 12 has an assembly support 34 to which the step assembly 14 is pivotally coupled so as to be pivotally mounted thereto in order to retract upon collision with a ground obstacle during, for example, on-road or in-field operation of the machine 10. The assembly support 34 and the step assembly 14 cooperate to provide a four-bar linkage 36 when the step assembly 14 is positioned in a configuration of the step assembly 14 as discussed in more detail herein.

Referring to FIGS. 5-7 and 11, the step assembly 14 includes a first siderail member 38a and a second siderail member 38b. The first and second siderail members 38a, 38b are positioned on opposite sides of, and parallel to, a central, longitudinal axis 40 of the ladder 12 and the step assembly 14 (FIG. 2).

The first and second siderail members 38a, 38b are mounted for pivotal movement about respective pivot axes 42a, 42b between a suspended use position (FIGS. 5 and 7) and a retracted position (FIG. 11) angled from the suspended use position laterally of the ladder 12 relative to the central axis 40 of the ladder 12 and step assembly 14. The first siderail member 38a is coupled to a first anchor 34a of the assembly support 34 for pivotal movement about the first pivot axis 42a such that the first siderail member 38a and the first anchor 34a cooperate to provide a pivot joint 43a. The second siderail member 38b is coupled to a second anchor 34b of the assembly support 34 for pivotal movement about the second pivot axis 42b such that the second siderail member 38b and the second anchor 34b cooperate to provide a pivot joint 43b. The first pivot axis 42a and the second pivot axis 42b are parallel to one another.

The first siderail member 38a and the second siderail member 38b are pivotable respectively about the first pivot axis 42a and the second pivot axis 42b between the suspended use position and the retracted position. In the suspended use position (FIGS. 5 and 7), the first and second siderail members 38a, 38b are suspended respectively from the first and second anchors 34a, 34b in a vertical orientation. In the retracted position (FIG. 11), the first and second siderail members 38a, 38b are angled from the suspended use position in a non-vertical orientation. The first and second siderail members 38a, 38b are angled rearwardly relative to the fore-aft axis 28, or laterally of the ladder 12 in a first direction relative to the central axis 40 of the ladder 12 and step assembly 14, in response to a force 20 applied to the step assembly 14 rearwardly relative to the fore-aft axis 28, or laterally in the first direction relative to the central axis 40 of the ladder 12 and step assembly 14. The first and second siderail members 38a, 38b are angled forwardly relative to the fore-aft axis 28, or laterally of the ladder 12 in an opposite second direction relative to the central axis 40 of the ladder 12 and step assembly 14, in response to a force 20 applied to the step assembly 14 forwardly relative to the fore-aft axis 28, or laterally in the second direction relative to the central axis 40 of the ladder 12 and step assembly 14.

Referring to FIGS. 5-7 and 12, the step assembly 14 includes a step 44. The step 44 is coupled to the first siderail member 38a and the second siderail member 38b. The step 44 may be the bottom step of the ladder 12.

Figure 12:
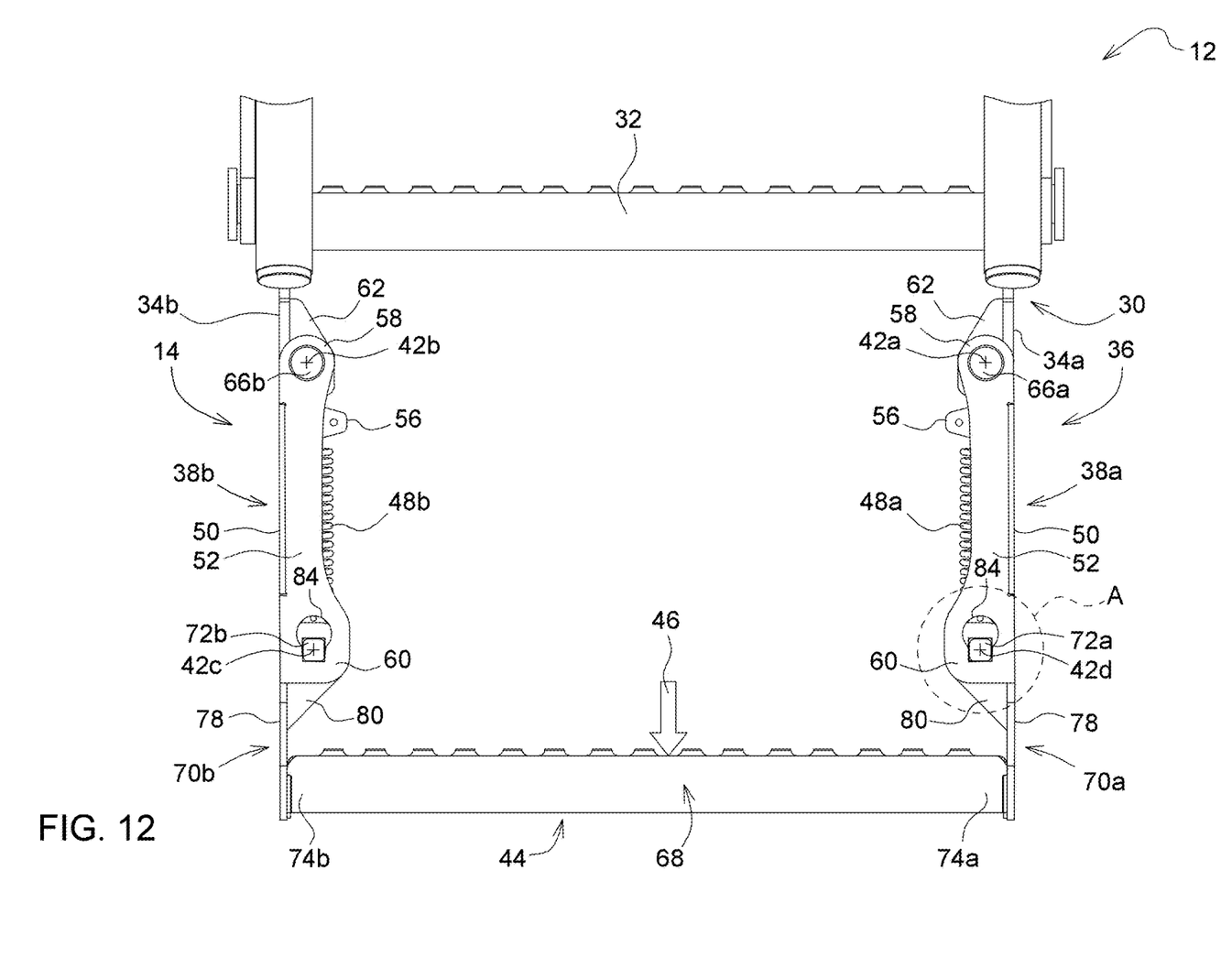
FIG. 12 is an elevation view showing the step in a locked position relative to the siderail members in response to application of a downward force on the step, such as by a person ascending or descending the ladder.

The step 44 has an unlocked position (FIGS. 5 and 7) and a locked position (FIG. 12). The step 44 is movable relative to the first and second siderail members 38a, 38b between the unlocked and locked positions. The step 44 is yieldably biased to the unlocked position. In the unlocked position, the step 44 is unlocked relative to the first and second siderail members 38a, 38b enabling the step 44 to swing with the first and second siderail members 38a, 38b laterally of the ladder 12, relative to the central axis 40, from the suspended use position to the retracted position in response to a retracting force 20. The step 44 is coupled to the first siderail member 38a and the second siderail member 38b for relative pivotal movement between the first siderail member 38a and the step 44 about a third pivot axis 42c such that the first siderail member 38a and the step 44 cooperate to provide a pivot joint 43c and between the second siderail member 38b and the step 44 about a fourth pivot axis 42d such that the second siderail member 38b and the step 44 cooperate to provide a pivot joint 43d enabling the step 44 to swing with the first siderail member 38a and the second siderail member 38b laterally of the ladder 12, relative to the central axis 40, from the suspended use position to the retracted position in response to application of the retracting force 20 to the step assembly 14 and to swing with the first siderail member 38a and the second siderail member 38b laterally of the ladder 12, relative to the central axis 40, from the retracted position to the suspended use position in response to release of the retracting force 20. The retracting force 20 may be directed rearwardly or forwardly with respect to the fore-aft axis 28 and laterally with respect to the central axis of the ladder 12 and step assembly 14. The step 44 can thus swing with the siderail members 38a, 38b side-to-side of the ladder 12, relative to the central axis 40, between the suspended use position and the retracted position when the step 44 is in the unlocked position.

The step 44 is responsive to a downward force 46 to move relative to the first siderail member 38a and the second siderail member 38b from the unlocked position to the locked position. In the locked positioned, the step 44 is locked to the first and second siderail members 38a, 38b against relative pivotal movement between the step 44 and the first and second siderail members 38a, 38b to keep the first and second siderail members 38a, 38b in the suspended use position for use of the step 44 by a person. The step 44 is locked to the first siderail member 38a and the second siderail member 38b against relative pivotal movement between the step 44 and the first siderail member 38a about the third pivot axis 42c and between the step 44 and the second siderail member 38b about the fourth pivot axis 42d for use of the step 44. The person applies the downward force 44 to the step 44 when the person is ascending or descending the ladder 14. The step 44 moves relative to the first siderail member 38a and the second siderail member 38b from the locked position to the unlocked position automatically in response to removal of the downward force 46 from the step 44.

All four pivot axes 42a, 42b, 42c, 42d are parallel to one another. In the use position, the third and fourth pivot axes 42c, 42d are lower than the first and second pivot axes 42a, 42b.

Referring to FIGS. 5-7 and 11 and 12, the step assembly 14 includes a first spring 48a and a second spring 48b. The first spring 48a is coupled to the first siderail member 38a and the step 44, and the second spring 48b is coupled to the second siderail member 38b and the step 44. The first and second springs 48a, 48b urge the step 44 toward the unlocked position. In the absence of the downward force 46, the step 44 assumes the unlocked position. The downward force 46 overcomes the biasing force of the springs 48a, 48b to move the step 44 from the unlocked position to the locked position. Upon removal of the downward force 46, the springs 48a, 48b move the step 44 from the locked position back to the unlocked position. Each spring 48a, 48b is configured, for example, as an extension spring, although it may be configured in any suitable manner to provide a biasing force that yieldably urges the step 44 to the unlocked position.

Referring to FIGS. 5-8, each siderail member 38a, 38b is configured, for example, as a link in the form of a bracket. The siderail member 38a, 38b includes a back wall 50, a first flange 52, a second flange 54, and a tab 56 for the respective spring 48a, 48b. The first flange 52 projects from a side edge of the back wall 50 at right angles thereto laterally inwardly relative to the central axis 40. The second flange 54 projects from an opposite side edge of the back wall 50 at right angles thereto laterally inwardly relative to the central axis 40. The first and second flanges 52, 54 are parallel to one another. The tab 54 is coupled to the back wall 50 so as to be mounted thereto and supported thereby. The tab 54 is positioned midway between the first and second flanges 52, 54 and projects laterally inwardly from the back wall 50 relative to the central axis 40. The siderail members 38a, 38b may be configured in a wide variety of ways.

Each of the first and second flanges 52, 54 includes an upper ear 58 and a lower ear 60 ("upper" and "lower" here relative to the suspended use position of the siderail members 38a, 38b). In the suspended use position, the upper ears 58 project from a top edge of the back wall 50 toward the assembly support 34, and the lower ears 60 project from a bottom edge of the back wall 50 toward the step 44.

Each anchor 34a, 34b includes a pair of ears 62 positioned between the upper ears 58 and a barrel 64 fixed (e.g., welded) to and extending between the anchor ears 62. A pivot pin 66a extends through the upper ears 58 of the first siderail member 38a and the anchor ears 62 and barrel 64 of the first anchor 34a to define the first pivot axis 42a and couple the first siderail member 38a to the first anchor 34 for pivotal movement about the first pivot axis 42a. A retaining pin 67 extends transversely through the pivot pin 66a to block withdrawal of the pivot pin 66a from the barrel 64. The retaining pin 67 may be configured, for example, as a cotter pin, one leg of which can be bent after insertion into the pivot pin 66a to block withdrawal of the retaining pin 67 from the pivot pin 66a. The first anchor 34a with its anchor ears 62 and barrel 64, the upper ears 58 of the first siderail member 38a, the pivot pin 66a, and the retaining pin 67 cooperate to provide the pivot joint 43a.

A pivot pin 66b extends through the upper ears 58 of the second siderail member 38b and the anchor ears 62 and barrel 64 of the second anchor 34b to define the second pivot axis 42b and couple the second siderail member 38b to the second anchor 34b for pivotal movement about the second pivot axis 42b. A retaining pin 67 extends transversely through the pivot pin 66b to block withdrawal of the pivot pin 66b from the barrel 64. The retaining pin 67 may be configured, for example, as a cotter pin, one leg of which can be bent after insertion into the pivot pin 66b to block withdrawal of the retaining pin 67 from the pivot pin 66b. The second anchor 34b with its anchor ears 62 and barrel 64, the upper ears 58 of the second siderail member 38b, the pivot pin 66b, and the retaining pin 67 cooperate to provide the pivot joint 43b.

Referring to FIGS. 5-7 and 9, the step 44 includes a stepping platform 68 on which a person steps, a pin support 70a, a pin support 70b, a pivot pin 72a that is supported by the pin support 70a, is coupled to the first siderail member 38a, and defines the third pivot axis 43c, and a pivot pin 72b that is supported by the pin support 70b, is coupled to the second siderail member 38b, and defines the fourth pivot axis 43d. The pin support 70a is coupled to a first end 74a of the stepping platform 68 so as to be fixed thereto. The pin support 70a projects from the first end 74a toward the first siderail member 38a into a gap 76 between the first and second flanges 52, 54 of the of the first siderail member 38a. The pin support 70b is coupled to a second end 74b of the stepping platform 68 so as to be fixed thereto. The pin support 70b projects from the second end 74b toward the second siderail member 38b into a gap 76 between the first and second flanges 52, 54 of the second siderail member 38b.

Each pin support 70a, 70b of the step 44 includes a flange 78, a pair of ears 80, and a barrel 82. The flange 78 is configured, for example, as a generally L-shaped plate with a base portion fixed (e.g., welded) to the respective end 74a, 74b of the stepping platform 68 and a support portion projecting from the base portion away from stepping platform 68 toward the respective siderail member 38a, 38b. The ears 80 are positioned between the lower ears 60 of the first and second flanges 52, 54 of the respective siderail member 38a, 38b. The barrel 82 is fixed (e.g., welded) to and extends between the ears 80.

The pivot pin 72a extends through the lower ears 60 of the first siderail member 38a and the ears 80 and barrel 82 of the pin support 70a and is fixed to the barrel 82 of the pin support 70a against movement relative thereto such that the pivot pin 72a defines the third pivot axis 43c. A pair of retaining pins 83 extend transversely from a first side of the barrel 82 through the pivot pin 72a into a second side of the barrel 82 opposite the first side to fix the pivot pin 72a to the barrel 82. Each retaining pin 83 may be configured, for example, as a rolled pin with a lengthwise split so as to form an interference fit with the barrel and/or the pivot pin 72a to hold the rolled pin in situ. The first pin support 70a with its ears 80 and barrel 82, the lower ears 60 of the first siderail member 38a, the pivot pin 72a, and the retaining pins 83 cooperate to provide the pivot joint 43c.

The pivot pin 72b extends through the lower ears 60 of the second siderail member 38b and the ears 80 and barrel 82 of the pin support 70b and is fixed to the barrel 82 of the pin support 70b against movement relative thereto such that the pivot pin 72b defines the fourth pivot axis 43d. A pair of retaining pins 83 extend transversely from a first side of the barrel 82 through the pivot pin 72b into a second side of the barrel 82 opposite the first side to fix the pivot pin 72b to the barrel 82. Each retaining pin 83 may be configured, for example, as a rolled pin with a lengthwise split so as to form an interference fit with the barrel and/or the pivot pin 72b to hold the rolled pin in situ. The second pin support 70b with its ears 80 and barrel 82, the lower ears 60 of the second siderail member 38b, the pivot pin 72b, and the retaining pins 83 cooperate to provide the pivot joint 43d.

Each pivot pin 72a, 72b is configured, for example as a single piece. In other embodiments, the pivot pin 72a, 72b may be configured as two separate pin segments that cooperate to define the respective pivot axis 43c, 43d, with one pin segment fixed to a first end of the barrel 82 and the other pin segment fixed to an opposite second end of the barrel 82.

Referring to FIGS. 5-7 and 10-13, the pivot joints 43c, 43d are configured for movement of the step 44 between the unlocked and locked positions, and for relative pivotal movement between the siderail members 38a, 38b and the step 44 when the step 44 is in the unlocked position. The pivot joint 43c includes a first keyhole 84, a second keyhole 86, and the pivot pin 72a, and the pivot pin 72a is positioned in the keyholes 84, 86 of the pivot joint 43c. The pivot joint 43d includes a first keyhole 84, a second keyhole 86, and the pivot pin 72b, and the pivot pin 72b is positioned in the keyholes 84, 86 of the pivot joint 43d.

The first siderail member 38a includes the keyholes 84, 86 of the pivot joint 43c, and the second siderail member 38b includes the keyholes 84, 86 of the pivot joint 43d. Each of the first and second flanges 52, 54 of each of the first siderail member 38a and the second siderail member 38b includes a respective keyhole 84, 86 of that siderail member 38a, 38b. Each lower ear 60 of the flanges 52, 54 of each siderail member 38a, 38b includes a respective keyhole 84, 86.

Figure 10:
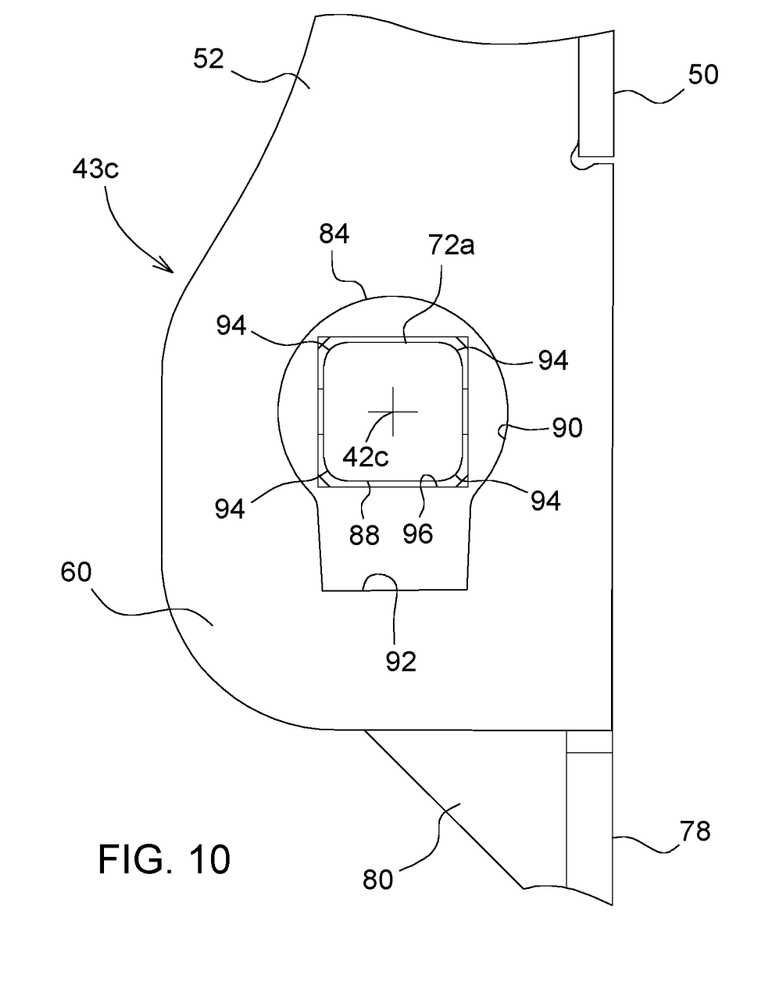
FIG. 10 is an enlarged elevation view of Region A of FIG. 7 showing a keyhole and a pivot pin positioned in a circular portion of the keyhole when the step is in the unlocked position.
Figure 13:
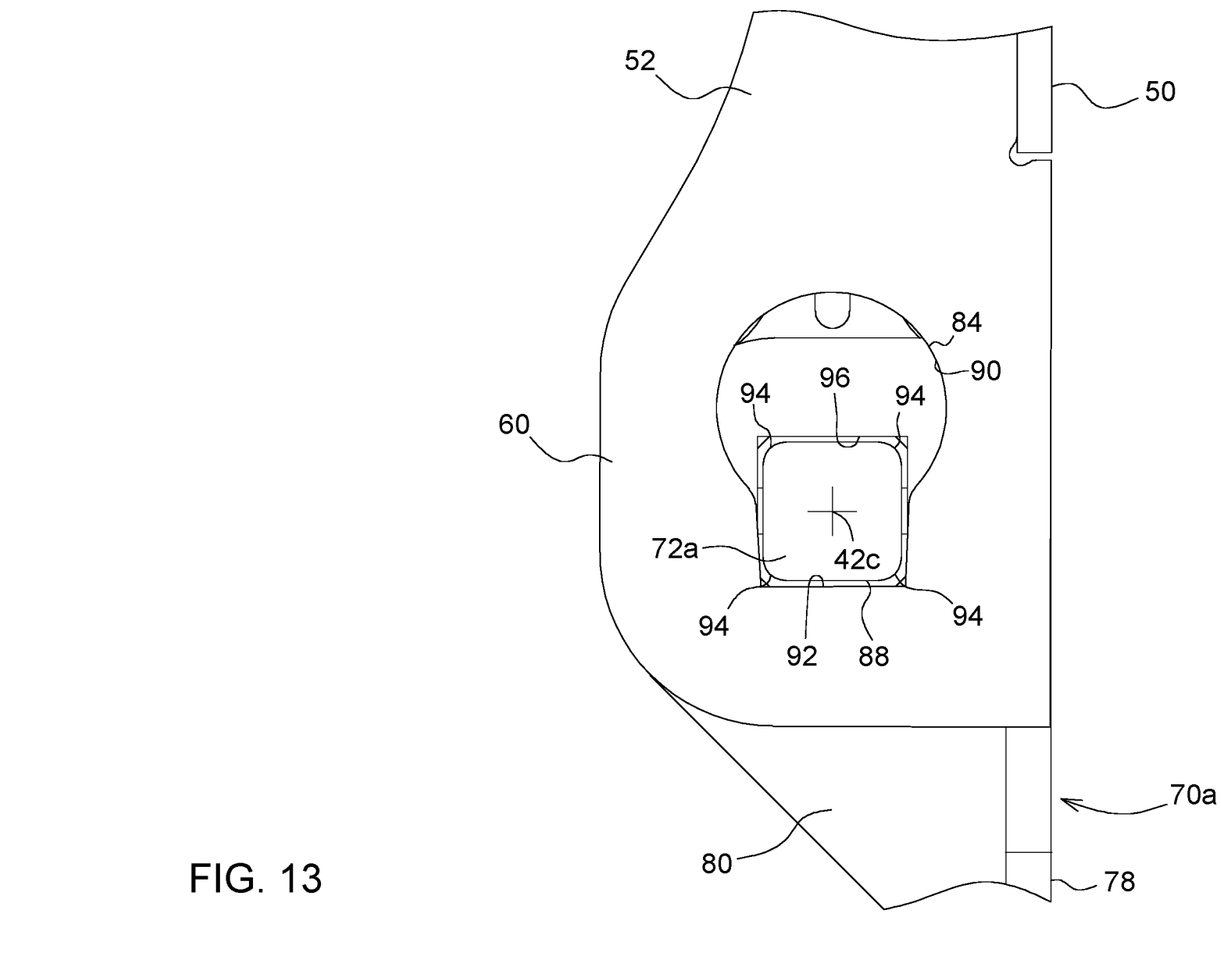
FIG. 13 is an enlarged elevation view of Region A of FIG. 12 showing the pivot pin in another portion of the keyhole generally matching a portion of the profile of the pivot pin.

Referring to FIGS. 10 and 13, the keyholes 84, 86 and the pivot pins 72a, 72b are configured to foster movement in the unlocked position and block movement in the locked position. Each pivot pin 72a, 72b has a geometric profile 88. Each keyhole 84, 86 includes a circular portion 90 and a geometric portion 92 in communication with the circular portion and having a width smaller than the diameter of the circular portion. With respect to each of the pivot joints 43c, 43d with its respective pivot pin 72a, 72b and its keyholes 84, 86, the circular portion 90 of the keyholes 84, 86 is configured to receive the pivot pin geometric profile 88 in the unlocked position of the step 44 enabling relative pivotal movement between the first siderail member 38a and the step 44 about the third pivot axis 42c and relative pivotal movement between the second siderail member 38b and the step 44 about the fourth pivot axis 42d and thereby effectively enabling pivotal movement of the first siderail member 38a about the first pivot axis 42a and pivotal movement of the second siderail member 38b about the second pivot axis 42b, so that the step 44 can swing with the first and second siderails 38a, 38b between the suspended use position and the retracted position, and the geometric portion 92 is configured to receive the pivot pin geometric profile 88 in the locked position of the step 44 blocking relative pivotal movement between the first siderail member 38a and the step 44 about the third pivot axis 42c and relative pivotal movement between the second siderail member 38b and the step 44 about the fourth pivot axis 42d and thereby effectively blocking pivotal movement of the first siderail member 38a about the first pivot axis 42a and pivotal movement of the second siderail member 38b about the second pivot axis 42b, so as to lock the siderails members 38a, 38b in the suspended use position and the step 44 therewith.

The geometric profile 88 and the circular portion 90 are thus sized to enable relative rotation between the geometric profile 88 and the circular portion 90 in the unlocked position, and the geometric profile 88 and the geometric portion 92 are sized to block relative rotation between the geometric profile 88 and the geometric portion 92 in the locked position. As such, the geometric profile 88 and the geometric portion 92 generally match one another in shape. The geometric profile 88 has curved corners 94 facilitating a smooth transition between the unlocked position and the locked position.

The geometric profile 88 is a rectangular profile, and the geometric portion 92 is a rectangular portion. The shape of the profile 88 and the shape of the portion 92 may have any other suitable geometric shape sufficient to effect the locking function in the locked position (e.g., hexagonal, octagonal).

The keyholes 84, 86 are included in each of the siderail members 38a, 38b, and the pivot pins 72a, 72b are included in the step 44. In such an arrangement, each keyhole 84, 86 is oriented with the circular portion 90 above the geometric portion 92 in the suspended use position of the siderail members 38a, 38b. In other embodiments, the keyholes 84, 86 are included in the step 44, and the pivot pins 72a, 72b are included respectively in the siderail members 38a, 38b. In such an arrangement, each keyhole 84, 86 is inverted with the geometric portion 92 above the circular portion 90 in the suspended use position of the siderail members 38a, 38b.

Referring to FIGS. 10 and 13, each pivot pin 72a, 72b extends through a hole 96 in the respective ears 80. Each hole 96 is configured to block rotation of the pivot pin 72a, 76a therein. The hole 96 has a geometric shape that matches the geometric profile 88 of the pivot pin 72a, 72b. Illustratively, the geometric shape of the hole 96 is rectangular.

Figure 5:
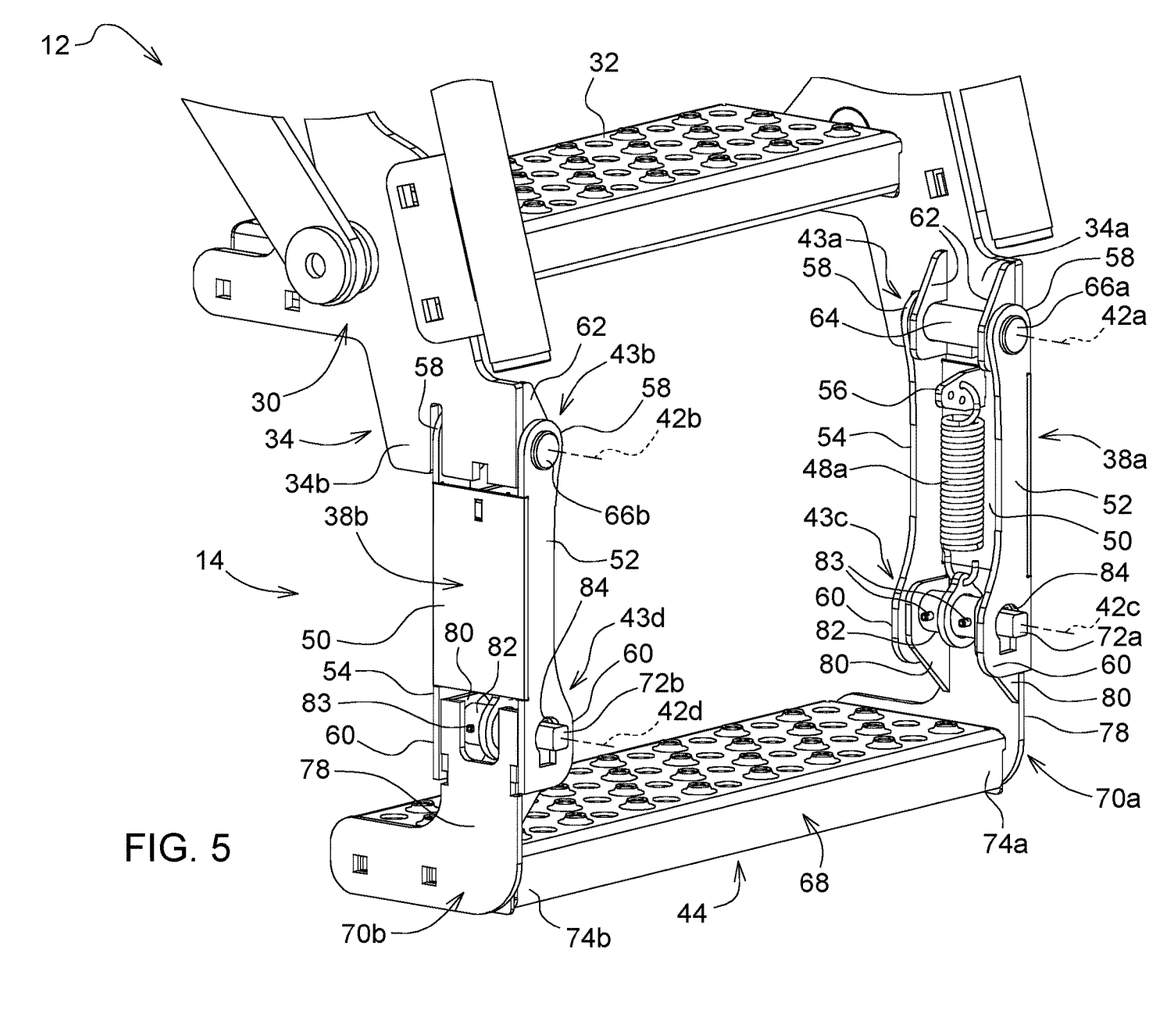
FIG. 5 is a perspective view showing the step assembly in the suspended use position.
Figure 6:
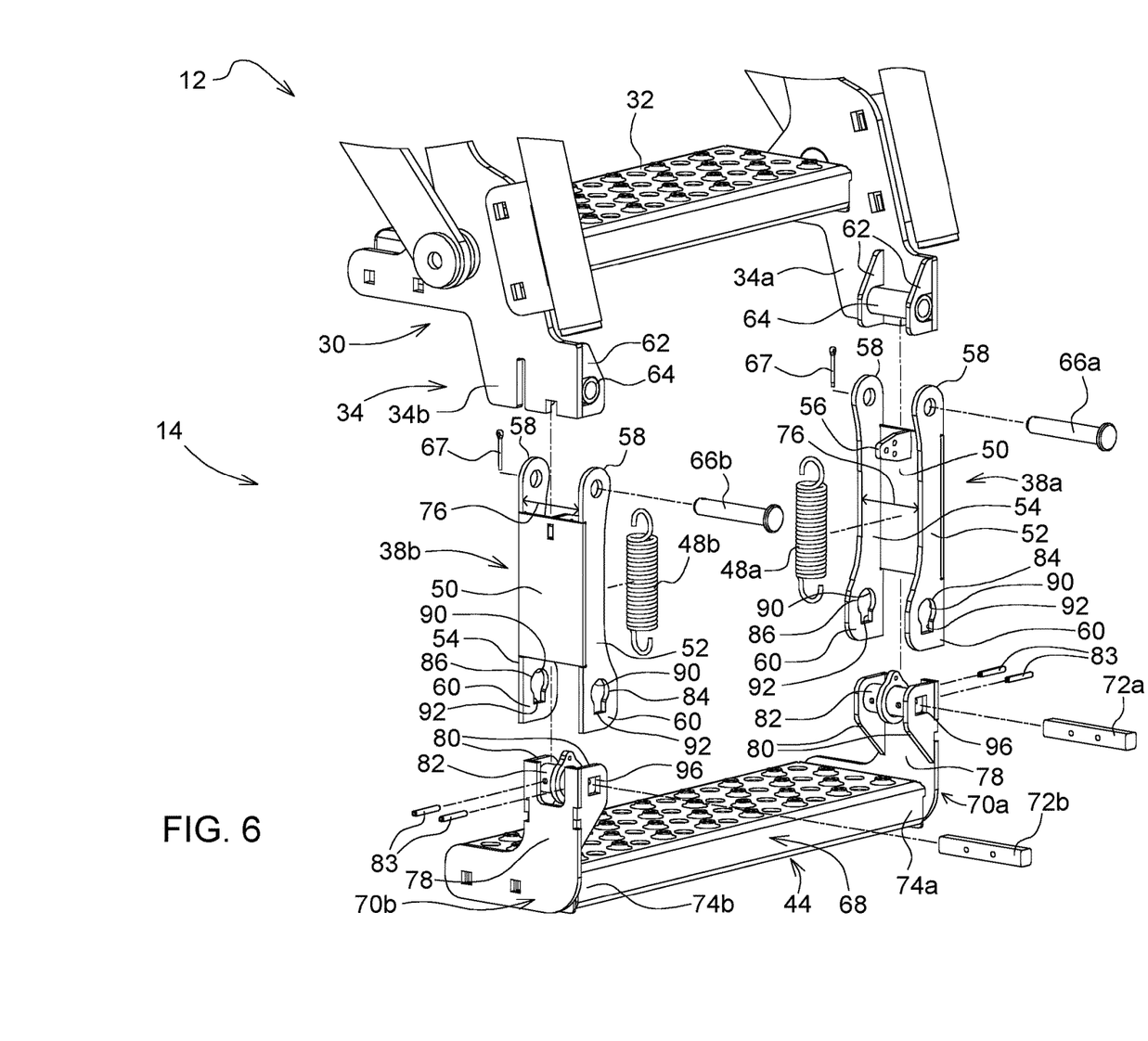
FIG. 6 is an exploded perspective view showing components of the step assembly.
Figure 8:
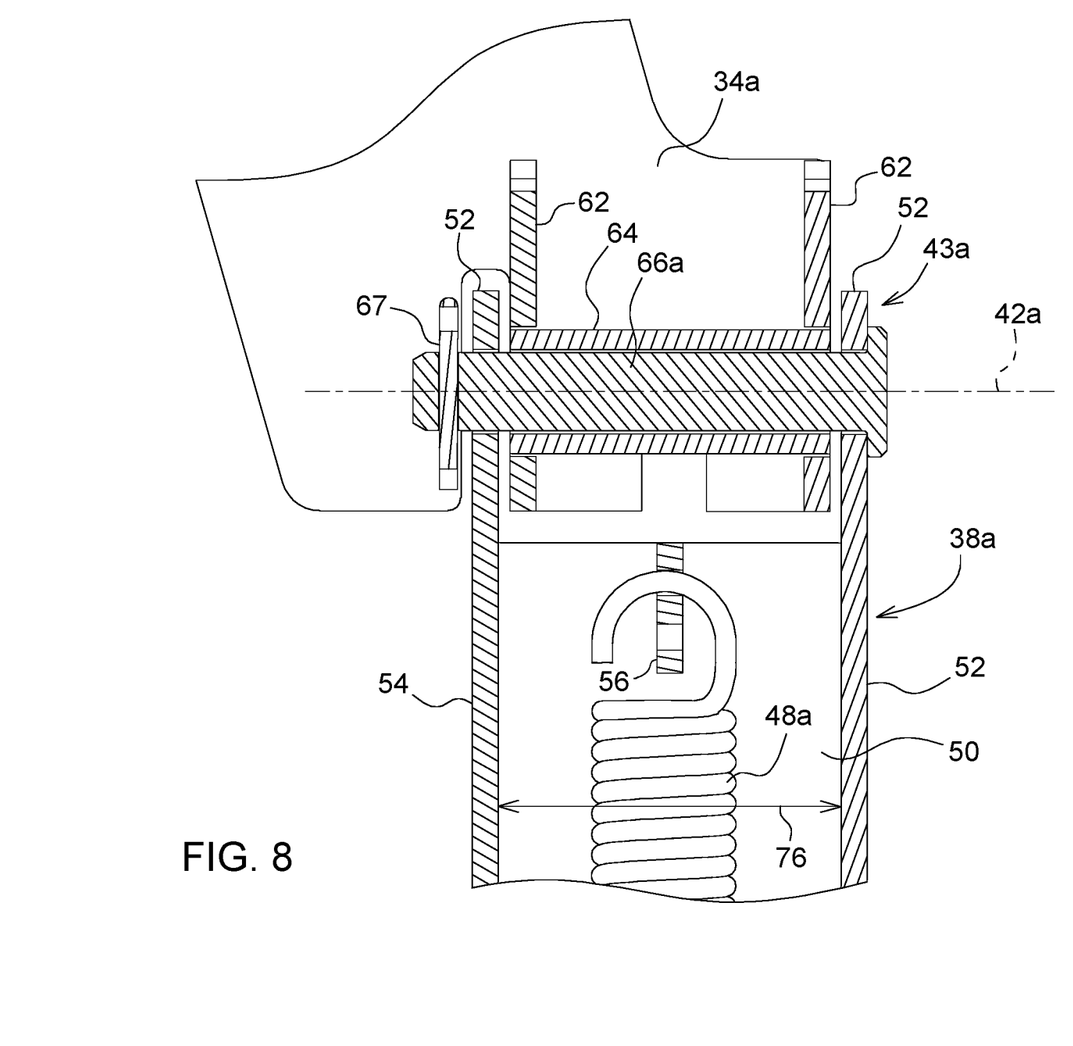
FIG. 8 is a sectional view, taken along lines 8-8 of FIG. 5, showing a pivot joint.
Figure 9:
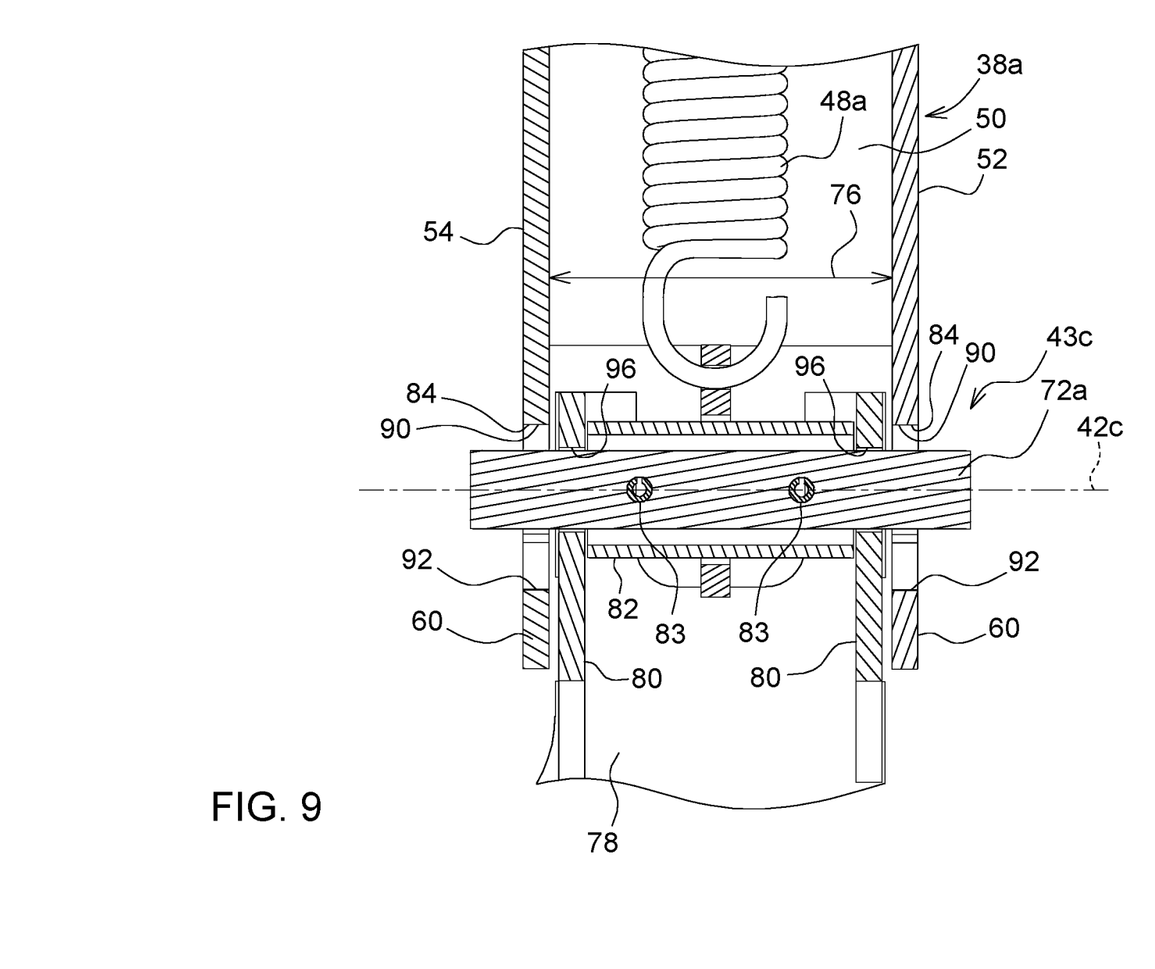
FIG. 9 is a sectional view, taken along lines 9-9 of FIG. 5, showing another pivot joint.

Referring to FIGS. 5, 8, and 9, the first spring 48a is coupled to the first siderail member 38a and the step 44, and the second spring 48b is coupled to the second siderail member 38b and the step 44. For example, the first spring 48a is coupled to the tab 56 of the first siderail member 38a and the first pin support 70a of the step 44, and the second spring 48b is coupled to the tab 56 of the second siderail member 38b and the second pin support 70b of the step 44. Each spring 48a, 48b includes a first hook positioned at a first end of the spring 48a, 48b and coupled to a hole of the tab 56 and a second hook positioned at an opposite second end of the spring 48a, 48b and coupled to a hole of the respective pin support 70a, 7b. Each tab 56 may include two or more holes to which the first hook of the respective spring 48a, 48b can be selectively coupled. Each pin support 70a, 70b includes a ring surrounding and fixed (e.g., welded) to the barrel 82 of the pin support 70a, 70b, and that ring includes a hole to which the second hook of the respective spring 48a, 48b is coupled.

Figure 7:
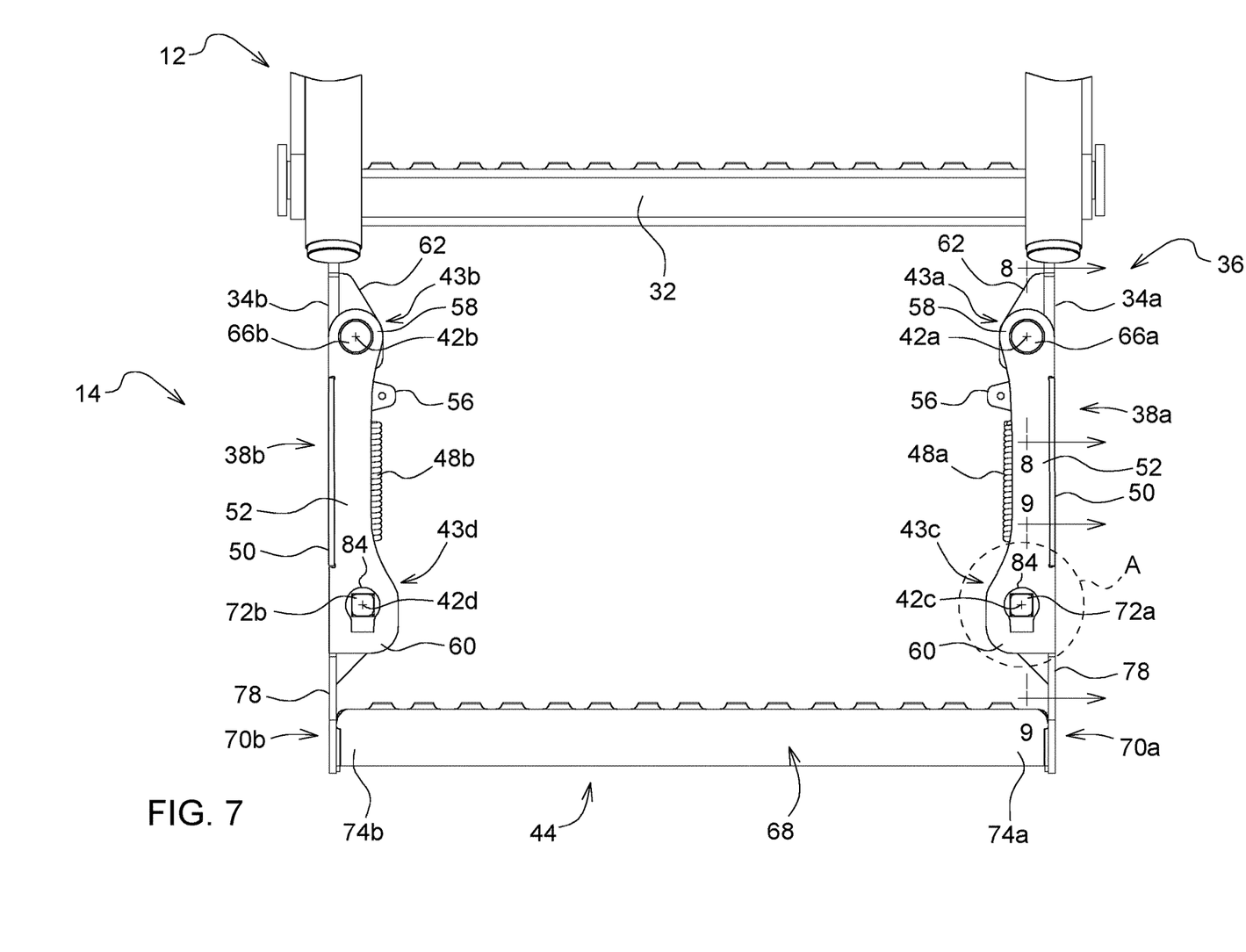
FIG. 7 is an elevation view showing the step assembly with a pair of siderail members in the suspended use position and a step yieldably biased to an unlocked position relative to the siderail members enabling pivotal movement of the step assembly in response to application of a force to the step assembly.
Figure 11:
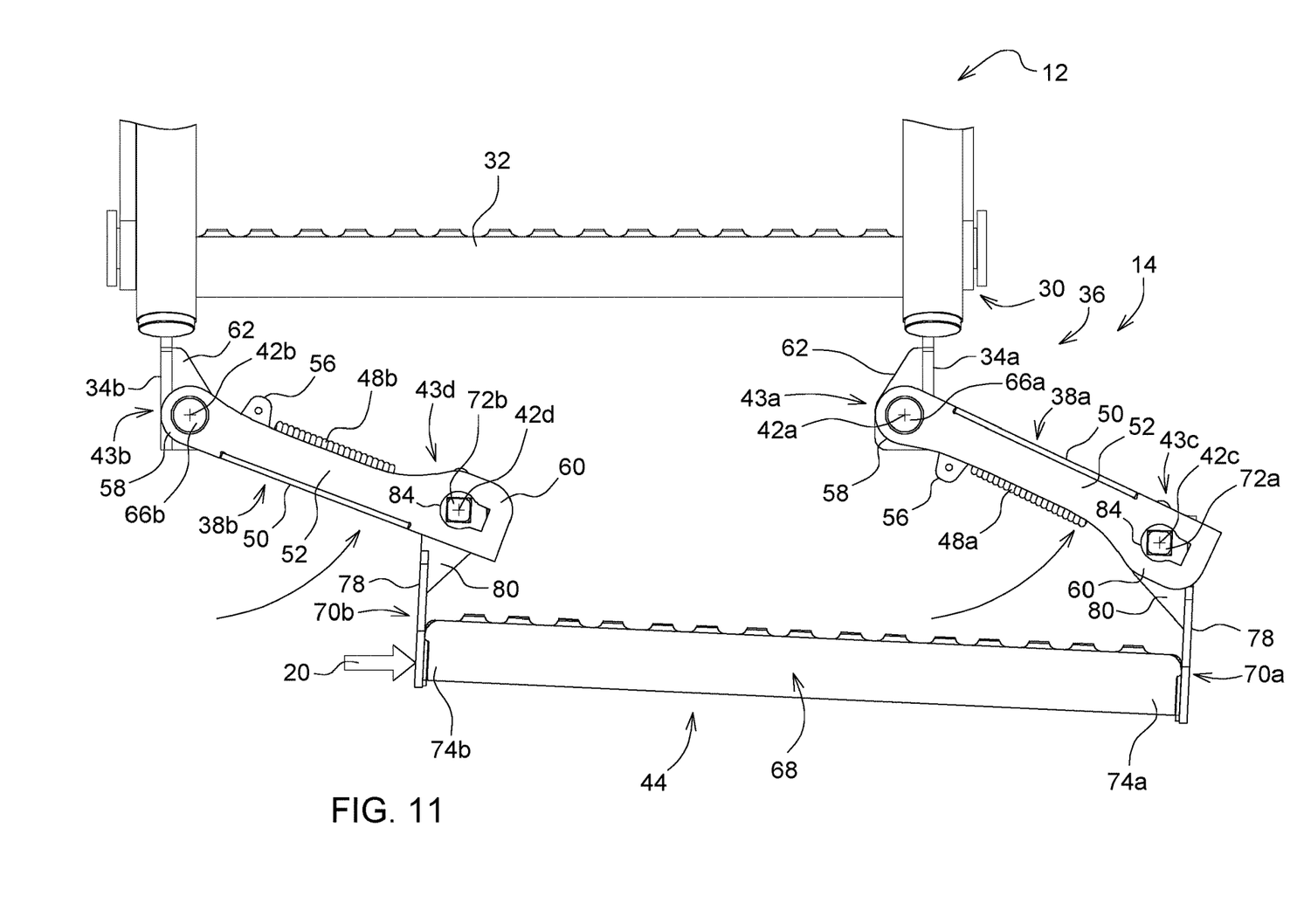
FIG. 11 is an elevation view showing the siderail members and the step in a retracted position in response to application of a force to the step assembly.

Referring to FIGS. 7 and 11, the assembly support 34 and the step assembly 14 are configured as a four-bar linkage 36 when the step 44 is positioned in the unlocked position. In the unlocked position, the first and second siderail members 38a, 38b can pivot respectively about the first and second pivot axes 42a, 42b, and relative pivotal movement is enabled between the first siderail member 38a and the step 44 about the third pivot axis 42c and between the second siderail member 38b and the step 44 about the fourth pivot axis 42d. As such, in the unlocked position, the assembly support 34 with its first and second anchors 34a, 34b, the first and second siderail members 38a, 38b, and the step 44 cooperate to provide the four-bar linkage 36. The assembly support 34 provides the ground member of the four-bar linkage 36, the siderail members 38a, 38b provide the two grounded members of the four-bar linkage 36, and the step 44 provides the floating member of the four-bar linage 36.

The step assembly 14 is retractable laterally relative to the central axis 40 when the ladder 12 is deployed. In the unlocked position of the step 44, the step assembly 14 is retractable in response to the force 20 so that the step assembly 14 can yield to and clear a ground obstacle. In the locked position of the step 44, the step assembly 14 is locked in place for use of the ladder 12.

For ease of illustration welds are not shown in the drawings but are to be understood.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A step assembly for use with a ladder, comprising:
a first siderail member and a second siderail member, the first siderail member and the second siderail member having respectively a first pivot axis and a second pivot axis, the first siderail member and the second siderail member pivotable respectively about the first pivot axis and the second pivot axis between a suspended use position and a retracted position angled from the suspended use position laterally of the ladder, and
a step coupled to the first siderail member and the second siderail member, the step having an unlocked position and a locked position, the step yieldably biased to the unlocked position in which the step is coupled to the first siderail member and the second siderail member for relative pivotal movement between the step and the first siderail member about a third pivot axis and between the step and the second siderail member about a fourth pivot axis enabling the step to swing with the first siderail member and the second siderail member laterally of the ladder from the suspended use position to the retracted position in response to a retracting force, the step responsive to a downward force to move relative to the first siderail member and the second siderail member from the unlocked position to the locked position in which the step is locked to the first siderail member and the second siderail member against relative pivotal movement between the step and the first siderail member about the third pivot axis and between the step and the second siderail member about the fourth pivot axis for use of the step.

2. The step assembly of claim 1, comprising a first spring and a second spring, and the first spring and the second spring urge the step toward the unlocked position.

3. The step assembly of claim 2, wherein the first spring is coupled to the first siderail member and the step, and the second spring is coupled to the second siderail member and the step.

4. The step assembly of claim 3, wherein each of the first siderail member and the second siderail member comprises a tab, the step comprises a stepping platform, a first pin support, a second pin support, a first pivot pin supported by the first pin support and coupled to the first siderail member, and a second pivot pin supported by the second pin support and coupled to the second siderail member, the first pin support and the second pin support project respectively from a first end of the stepping platform and a second end of the stepping platform, the first spring is coupled to the tab of the first siderail member and the first pin support, and the second spring is coupled to the tab of the second siderail member and the second pin support.

5. The step assembly of claim 1, wherein the first siderail member and the step cooperate to provide a first pivot joint, the second siderail member and the step cooperate to provide a second pivot joint, the first pivot joint comprises a keyhole and a pivot pin positioned in the keyhole of the first pivot joint, and the second pivot joint comprises a keyhole and a pivot pin positioned in the keyhole of the second pivot joint.

6. The step assembly of claim 5, wherein each of the pivot pins has a rectangular profile, and, with respect to each of the first pivot joint and the second pivot joint, the keyhole comprises a circular portion configured to receive the rectangular profile of the pivot pin in the unlocked position of the step and a rectangular portion in communication with and configured to receive the rectangular profile of the pivot joint in the locked position of the step.

7. The step assembly of claim 5, wherein the first siderail member comprises the keyhole of the first pivot joint, the second siderail member comprises the keyhole of the second pivot joint, and the step comprises the pivot pin of the first pivot joint and the pivot pin of the second pivot joint.

8. The step assembly of claim 7, wherein the first pivot joint comprises another keyhole included in the first siderail member and in which the pivot pin of the first pivot joint is positioned, and the second pivot joint comprises another keyhole included in the second siderail member and in which the pivot pin of the second pivot joint is positioned.

9. The step assembly of claim 8, wherein each of the first siderail member and the second siderail member comprises two ears, each ear of the first siderail member comprises a respective one of the keyholes included in the first siderail member, and each ear of the second siderail member comprises a respective one of the keyholes included in the second siderail member.

10. The step assembly of claim 8, wherein each of the first siderail member and the second siderail member is configured as a bracket comprising a back wall, a first flange projecting from the back wall at right angles thereto, and a second flange projecting from the back wall at right angles thereto, and each of the first and second flanges of each of the first siderail member and the second siderail member comprises a respective one of the keyholes of that siderail member.

11. The step assembly of claim 10, wherein the step comprises a stepping platform, a first pin support projecting from a first end of the stepping platform toward the first siderail member into a gap between the first and second flanges of the first siderail member and supporting the pivot pin of the first pivot joint positioned in the keyholes of the first and second flanges of the first siderail member, and a second pin support projecting from a second end of the stepping platform toward the second siderail member into a gap between the first and second flanges of the second siderail member and supporting the pivot pin of the second pivot joint positioned in the keyholes of the first and second flanges of the second siderail member.

12. The step assembly of claim 11, comprising a first spring and a second spring, wherein the first siderail member comprises a tab supported by the back wall of the first siderail member, the second siderail member comprises a tab supported by the back wall of the second siderail member, the first spring is coupled to the tab of the first siderail member and the first pin support, and the second spring is coupled to the tab of the second siderail member and the second pin support.

13. The step assembly of claim 1, wherein the first pivot axis, the second pivot axis, the third pivot axis, and the fourth pivot axis are parallel to one another.

14. The step assembly of claim 1, wherein the first siderail member is coupled to an assembly support for pivotal movement about the first pivot axis, the second siderail member is coupled to the assembly support for pivotal movement about the second pivot axis, and the assembly support, the first siderail member, the second siderail member, and the step cooperate to provide a four-bar linkage when the step is positioned in the unlocked position.

15. A ladder comprising the step assembly of claim 14, wherein the assembly support is included in the ladder and comprises a first anchor to which the first siderail member is coupled for pivotal movement about the first pivot axis and a second anchor to which the second siderail member is coupled for pivotal movement about the second pivot axis.

16. The ladder of claim 15, wherein the step is a bottom step of the ladder.

17. A step assembly for use with a ladder, comprising:
a first siderail member and a second siderail member, the first and second siderail members mounted for pivotal movement about respective pivot axes between a suspended use position and a retracted position angled from the suspended use position laterally of the ladder, and a step, with the first siderail member and the second siderail member in the suspended use position, movable relative to the first siderail member and the second siderail member between an unlocked position and a locked position, the step yieldably biased to the unlocked position, wherein, in the unlocked position, the step is unlocked relative to the first and second siderail members enabling the step to swing with the first and second siderail members laterally of the ladder from the suspended use position to the retracted position in response to a retracting force and, in the locked positioned, the step is locked to the first and second siderail members against relative pivotal movement between the step and the first and second siderail members to keep the first and second siderail members in the suspended use position for use of the step.

* * * * *